(12) United States Patent
Xia et al.

(10) Patent No.: US 7,499,605 B1
(45) Date of Patent: Mar. 3, 2009

(54) FIBER BRAGG GRATING FOR HIGH TEMPERATURE SENSING

(75) Inventors: Hua Xia, Altamont, NY (US); Kevin Thomas McCarthy, Troy, NY (US); Kung-Li Justin Deng, Waterford, NY (US); Fulton Jose Lopez, Clifton Park, NY (US); Aaron John Avagliano, Houston, TX (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/855,457

(22) Filed: Sep. 14, 2007

(51) Int. Cl.
*G02B 6/00* (2006.01)
*C03B 37/023* (2006.01)

(52) U.S. Cl. .................. 385/12; 385/37; 385/123; 385/126; 65/385; 65/390; 438/32

(58) Field of Classification Search ............ 385/12, 385/37, 31, 123, 122, 124, 126, 127, 128, 385/141, 142, 143, 144; 65/385, 390, 394; 250/227.11, 227.14, 227.18; 438/32
See application file for complete search history.

(56) References Cited

U.S. PATENT DOCUMENTS

| | | | |
|---|---|---|---|
| 5,007,705 A | 4/1991 | Morey et al. | |
| 5,852,690 A * | 12/1998 | Haggans et al. | 385/37 |
| 6,009,222 A * | 12/1999 | Dong et al. | 385/127 |
| 6,035,083 A * | 3/2000 | Brennan et al. | 385/37 |
| 6,112,553 A | 9/2000 | Poignant et al. | |
| 6,601,411 B2 * | 8/2003 | MacDougall et al. | 65/378 |
| 6,647,160 B1 | 11/2003 | Chi et al. | |
| 6,728,444 B2 * | 4/2004 | Brennan et al. | 385/37 |
| 7,068,884 B2 * | 6/2006 | Rothenberg | 385/37 |
| 7,151,872 B1 | 12/2006 | Xia et al. | |
| 7,228,017 B2 * | 6/2007 | Xia et al. | 385/12 |
| 2003/0002795 A1 | 1/2003 | Fisher et al. | |

OTHER PUBLICATIONS

Xia Zhang, Jingxi Zhao, Yongqing Huang, Xiaomin Ren; "Analysis of Shift in Bragg wavelength of Fiber Bragg Gratings with Finite Cladding Radius"; Proceedings of ICCT2003; pp. 586-589.

* cited by examiner

*Primary Examiner*—Brian M Healy
(74) *Attorney, Agent, or Firm*—Patrick K. Patnode

(57) ABSTRACT

A method of fiber core material band gap engineering for artificially modifying fiber material properties is provided. The method includes doping the fiber core material with one or more atoms for enhancing photosensitivity to the fiber material. The method also includes co-doping the fiber core material with one or more ions for enhancing an amorphous network crosslink mean coordination number. The method further includes thermally annealing the fiber core material for widening the band gap of the fiber core material.

31 Claims, 19 Drawing Sheets

FIBER BRAGG GRATING FOR HIGH TEMPERATURE SENSING

BACKGROUND

The invention relates generally to a fiber Bragg grating based temperature sensing device and, more particularly, to thermally stabilized fiber Bragg grating based temperature sensing devices that can be operated at elevated temperatures beyond 1000 K.

Temperature sensing is essential for a safe and efficient operation and control of many industrial processes. Industrial processes such as coal boiler operation, combustion, power generation, and gasification involve the measurement of high temperatures either for real-time industrial process monitoring or for control and optimization.

In general, there are several techniques used for measurement of temperatures beyond 1000 K. Some of the commonly used techniques include a thermocouple, pyrometry and blackbody measurement. Further, Fiber Bragg grating (FBG) based fiberoptic temperature sensors have been found to be a potential method for elevated temperature measurement. FBG is a high quality reflector constructed in an optical fiber that reflects particular wavelengths of light and transmits other wavelengths. This is generally achieved by adding a periodic variation to a refractive index of the fiber. It is advantageous to use FBG for power generation industrial process monitoring because of low mass, high sensitivity, multiplexing, multi-point distribution, and electromagnetic interference immunity.

However, the ultraviolet (UV) light induced FBG sensors exhibit undesirable thermal instability at elevated temperatures. The grating is generally completely erased at a temperature of around 900 K after only a few, for example 2-4, hours of operation. Conventional UV inscribed FBG commonly includes a Type-I, a Type-IIA and a Type-II grating. The Type I grating is a periodic refractive index modulated grating structure that degrades at temperatures higher than about 500 K, again, after only a few, for example 2-4, hours of operation. As used herein, the term 'erasure' refers to a change in refractive index of the grating. A second type of grating that is inscribed after a Type-I grating and is also referred to as Type-IIA grating, is a negative refractive index grating and is generally found to have an erasure temperature of about 800 K after only a few, for example 2-4, hours of operation. A Type-II grating inscribed after a Type-IIA grating has a broad reflective spectrum that is undesirable for high temperature sensing applications.

Therefore, a need exists for an improved engineering fiber material and a grating inscription method to obtain highly thermal stabilized temperature-sensing device that addresses one or more of the problems set forth above and survives harsh environment conditions.

BRIEF DESCRIPTION

In accordance with one aspect of the invention, a method of fiber core material band-gap engineering for artificially fiber material properties is provided. The method includes doping the fiber core material with one or more atoms for enhancing photosensitivity to the fiber material. The method also includes co-doping the fiber core material with one or more ions for enhancing an amorphous network crosslink mean coordination number. The method further includes thermally annealing the fiber core material for widening the band gap of the fiber core material.

In accordance with one aspect of the invention, a method of fabrication of a thermally stabilized fiber Bragg grating based temperature sensing device is provided. The method includes doping a fiber core material for enhancing photosensitivity. The method also includes co-doping the fiber core material for increasing a mean coordination number The method further includes inscribing a periodic or quasiperiodic modulated refractive index structure in the fiber core as a Type-I-like grating. The method also includes performing a band-gap engineering of the Type-I-like grating to prompt a growth of a Type IIA-like grating. The method also includes structural processing of the Type-II-like grating and annealing to form a nanophase tetrahedral Type II-like grating structure.

In accordance with another aspect of the invention, a thermally stabilized fiber Bragg-grating based sensor is provided. The sensor includes a fiber core having a plurality of Bragg grating elements, wherein the grating elements include a periodic or a quasiperiodic modulated tetrahedral structure and an apodized grating profile. The sensor also includes a depressed cladding disposed about the fiber core and configured to confine a guided wave within the fiber core. The sensor further includes a cladding disposed around the depressed cladding.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a thermally stabilized Fiber Bragg grating based sensing device and a method of fabricating the same. As used herein, the sensing device refers to a sensing device including a fiber Bragg grating structure that can withstand high temperatures of the order of at least 1000 K. Further, the method of fabricating the sensing device focuses on a formation mechanism of a fiber Bragg grating structure in order to develop a highly thermal stabilized nanocrystalline fiber Bragg grating (NFBG) based sensor to be used in high temperature applications such as, but not limited to, a gasification radiant cooler harsh environment. A method of fiber core material band-gap engineering is also discussed. The method includes a process to transition the fiber core material from a 'floppy' status or Type-I grating to an intermediate status or Type-IIA-like grating to a rigid status or a Type II-like grating. As used herein, the term 'floppy status' refers to an underconstrained and elastically soft fiber material with a material rigidity between about 2 and about 2.4 and the term 'intermediate staus' refers to an optimally constrained, rigid and stress free fiber material that has a material rigidity value equal to about 2.4. Further, the term 'rigid status' refers to an overconstrained rigid fiber material that leads to formation of tetrahedral clusters having a material rigidity between about 2.4 and about 4. The 'rigid status' is tolerable to high temperatures due to percolative tetrahedral cluster formation. The term 'material rigidity' may also be referred to as silicon atom bonds mean coordination number, which has a maximum value of 4 for diamond-like tetrahedral structure.

Figure 1:
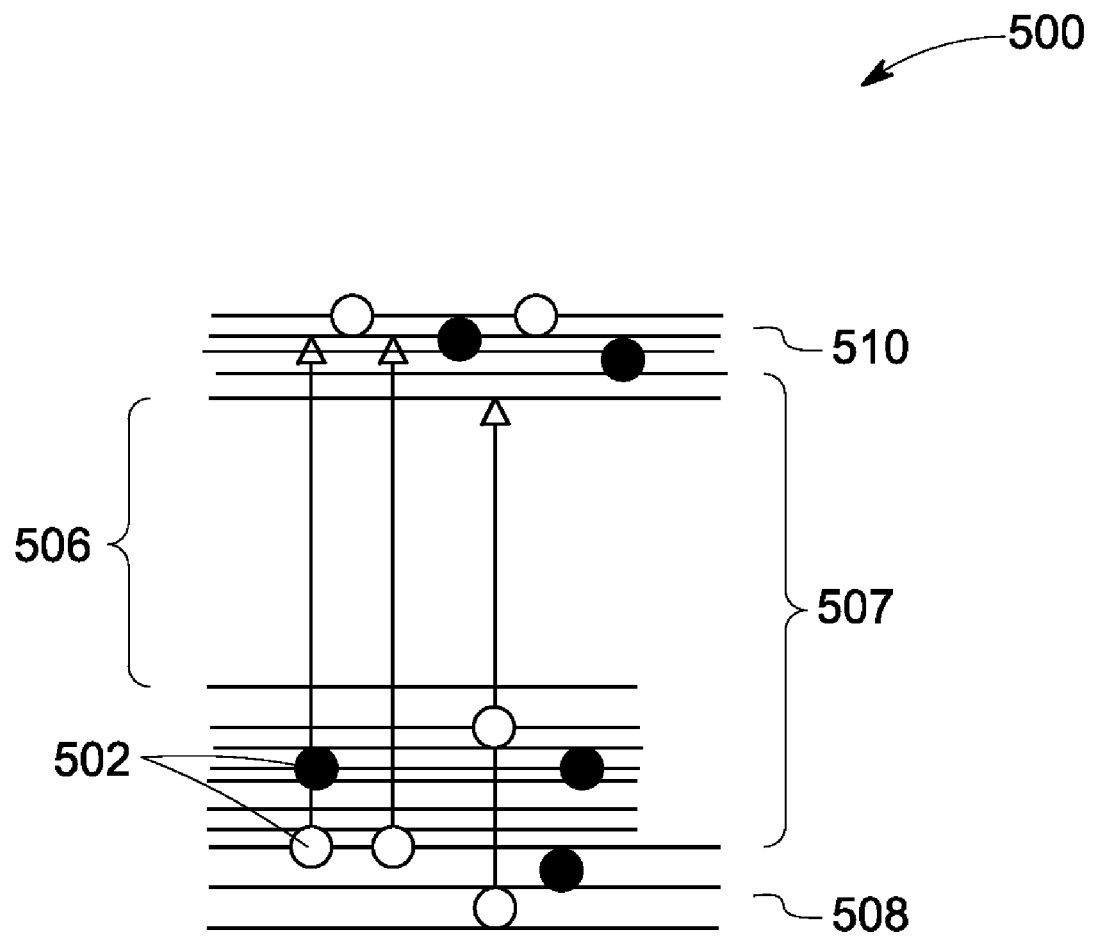
FIG. 1 is a schematic illustration of a band gap of a modified fiber material in accordance with an embodiment of the invention.

Referring to the drawings, FIG. 1 is a schematic illustration of a band gap diagram 500 of a modified fiber material with doped foreign atoms such as, but not limited to, germanium, boron, erbium, and phosphorous, for functionalizing fiber to have photosensitivity and also by co-doping ions H+1, F−1, Cl−1 etc to increase fiber material crosslink mean coordination number while reducing dangling bonds. In a non-limiting example, the fiber material includes silicon dioxide. The doped atoms and the co-doped ions in the fiber material naturally form discrete energy levels in between low energy levels or covalence bands 508 and higher energy levels or conduction bands 510. The carriers 502 for example, electrons and holes, can jump from the low energy levels 508 to the higher energy levels 510 even at a low temperature.

Dopant and impurities effectively reduce band gap energy of the fiber material. A method for band gap engineering disclosed herein effectively eliminates the reduction of the band gap energy by a thermal annealing process. Such a thermal treatment process widens fiber core material band-gap from a range between about 1 eV and about 3 eV represented by reference numeral 506 to a range between about 4 eV and about 7 eV represented by reference numeral 507. Some of the impurity and dopant energy levels are eliminated after the thermal annealing process, so that transfer of the carriers 502 from the low-level bands and covalence band 508 to the conduction band 510 is less likely even at elevated temperatures.

Accompanying the band-gap engineering process, the fiber material nanostructures and morphology experience phase transitions from underconstrained "soft" floppy amorphous across linked network to stress-free intermediate phase, and overconstrained tetrahedral phase. Furthermore, thermal treatment process presented here also effectively promotes the percolation transition of localized tetrahedral structure to form thermally stabilized fiber material nanostructure.

The fiber material band-gap engineering method effectively prompts the nanostructure and morphology evolution from floppy underconstrained amorphous network to tetrahedral diamond-like nanophase structure. The periodic or quasi-periodic modulation of the refractive index is kept during the band-gap engineering method in which the low-refractive-index area corresponds to low-density tetrahedral clusters, while high-refractive-index area corresponds to percolative tetrahedral nanophase structure. Such an alternative nanophase nanostructure effectively construct a refractive index modulation in a fiber core.

Figure 2:
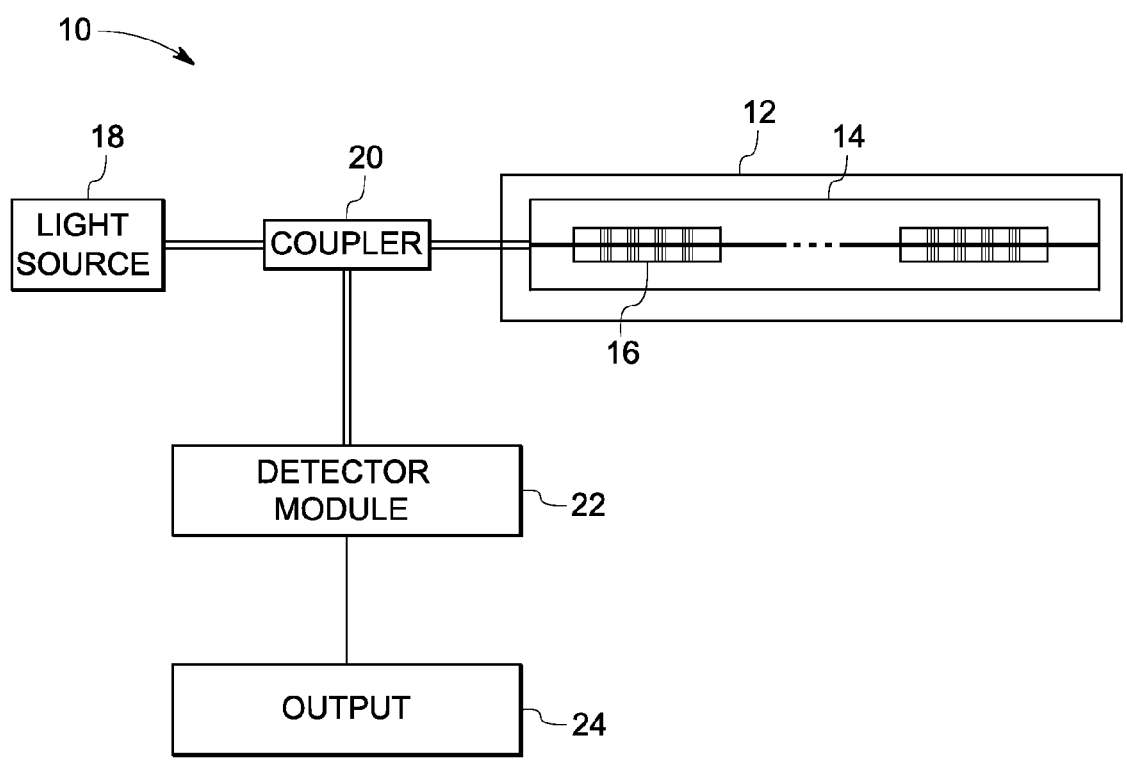
FIG. 2 illustrates an exemplary fiber optic sensing system using a fiber optic grating structure for detecting temperature at multiple locations in a harsh environment in accordance with an embodiment of the invention.

FIG. 2 illustrates an exemplary fiber optic sensing system 10 for detecting multiple parameters in a harsh environment 12. The fiber optic sensing system 10 includes one or more fiber optic sensors 14 that, in turn, include a fiber Bragg grating structure 16. As illustrated, the sensors 14 are disposed in the environment 12, causing changes in parameters in the environment 12 to translate to the fiber Bragg grating structure 16. The grating structure 16 includes a core that has a plurality of grating elements having a periodic or a quasiperiodic modulated Bragg grating structure.

Further, the fiber optic sensing system 10 includes a light source 18 that is configured to illuminate the grating structure 16. This illumination facilitates the generation of reflected signals corresponding to a grating period of the grating structure 16. The system 10 also includes an optical coupler 20 to manage incoming light from the light source 18 as well as the reflected signals from the grating structure 16. The coupler 20 directs the appropriate reflected signals to a detector module 22.

The detector module 22 receives the reflected optical signals from the grating structure 16 and, in cooperation with various hardware and software components, analyzes the embedded information within the optical signals. For example, the detector module 22 is configured to estimate a condition or a parameter of the environment 12 based upon a reflection spectrum generated from the grating structures 16 of the fiber optic sensor 14. In certain embodiments, the detector module 22 employs an optical coupler or an optical spectral analyzer to analyze signals from the fiber optic sensor 14. Depending on a desired application, the detector module 22 may be configured to measure various parameters in the environment 12. Examples of such parameters include temperature, the presence of gas, strain, pressures vibration, and radiation among others. The information developed by the detector module 22 may be communicated to an output 24 such as, a display or a wireless communication device.

Figure 3:
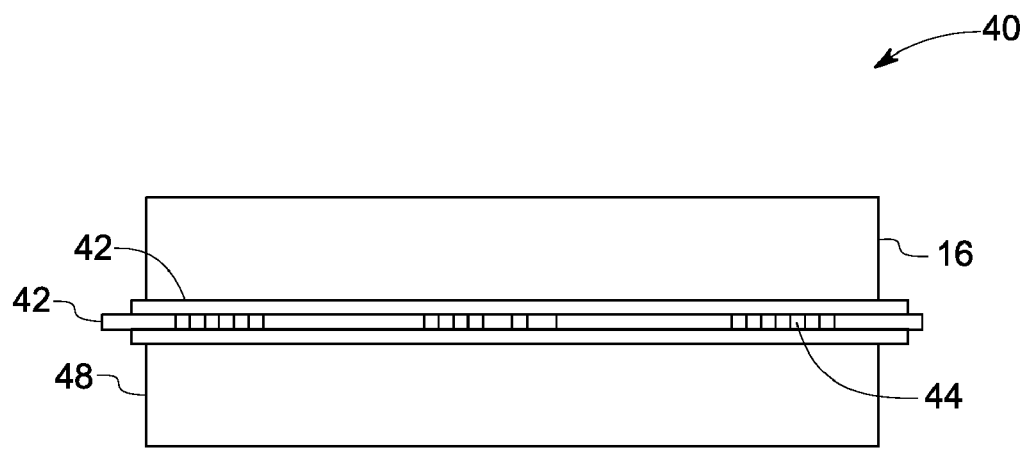
FIG. 3 is a cross-sectional view of an exemplary configuration of the fiber optic grating structure in FIG. 2.

FIG. 3 is a cross-sectional view of an exemplary configuration 40 of the fiber optic grating structure 16 in FIG. 2. The fiber optic grating structure 16 includes a fiber core 42 with multiple grating elements 44 and a depressed cladding 46 disposed around the fiber core 42. As used herein, the term "depressed cladding" refers to a suppressed cladding mode wherein a fiber core-cladding interface is fabricated by lightly doping an initial cladding thickness of about 20 µm to about 40 µm with fluorine followed by heavily doping rest of the cladding so as to obtain a difference of about 0.001 in refractive index from that of the fiber core.

In a particular embodiment, the fiber core 42 includes silicon dioxide doped with germanium dioxide. In another embodiment, the fiber core 42 includes only germanium dioxide. In yet another embodiment, the depressed cladding 46 includes silicon dioxide with a fluorine ion dopant. Further, a cladding 48 is disposed around the depressed cladding 46. In an example, the cladding 48 includes silicon dioxide. The use of the depressed cladding 46 is intended to effectively confine the dopants inside the fiber core 42 without diffusing into the cladding 48 by elevated temperature.

The depressed cladding 46 and the cladding 48 have a lower index of refraction than that of the fiber core 42 in order to steer light into the fiber core 42. Further, the fiber core 42 includes a series of grating elements 44 that are configured to reflect in phase wavelengths of light corresponding to a grating period of the grating elements 44. The grating elements 44 are fabricated so as to withstand high temperatures of the order of at least about 1000 K and provide a thermally stable fiber Bragg grating based sensor.

Figure 4:
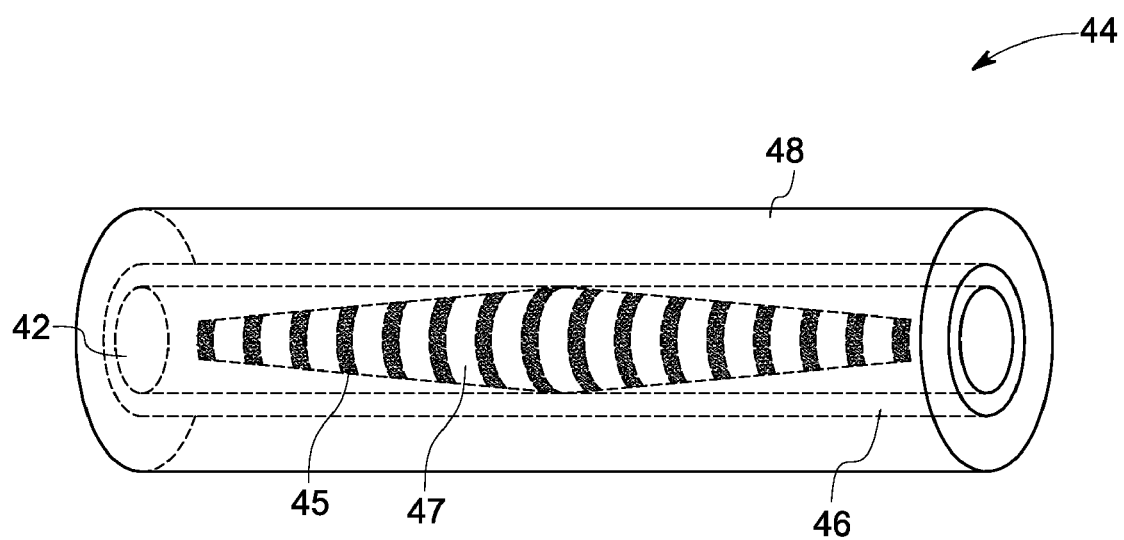
FIG. 4 is a diagrammatic illustration of exemplary grating elements including a Gaussian apodized grating profile in FIG. 3.

FIG. 4 is a diagrammatic illustration of exemplary grating elements 44 in FIG. 3 including a Gaussian apodized grating profile. The apodized grating profile eliminates sub-coherent peaks and sharp discontinuities for signal processing and peak tracking. Advantageously, the depressed cladding 46 in FIG. 5 and the grating elements 44 confine a guided wave within the fiber core 42 to avoid transmission loss and eliminate high-order coherent interference from adjunct grating interfaces. Further, cladding wavelength modes that reduce signal to noise ratio are suppressed. A mean coordination number that may be floppy status or highly percolative tetrahedral clusters or in-between the floppy status and the tetrahedral cluster inherently dominates the fiber core material nanostructure. Regions 45 and 47 corresponding to mass density difference induced by both UV light illumination and thermal treatment.

Typically, the types of grating such as Type-I, Type-IIA and Type-II refer to an underlying photosensitivity mechanism by which grating fringes are produced in a fiber. In order to withstand high temperatures, the grating elements 44 are fabricated such that the type of grating formed as an end product is high temperature resistant enough to meet desired requirements. A formation mechanism of such a type of grating is discussed below.

In one example, the Type II-like grating elements 44 may be induced from hydrogen loaded as well as hydrogen unloaded single mode fibers that require high-power UV laser light or near infrared (NIR) femtosecond laser light inscription and following a thermal annealing process at temperatures between about 1000K and about 1100 K. In another example, the grating elements 44 are optimized by co-doping different photosensitive atoms such as, but not limited to, boron, fluorine, chlorine, tin, and nitrogen disposed in at least one of the fiber core 42 or the depressed cladding 46.

Figure 5:
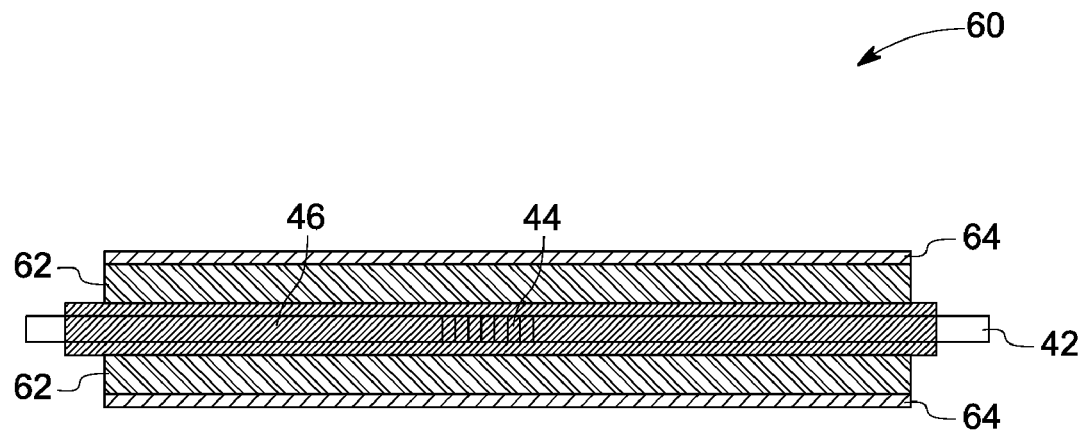
FIG. 5 is a cross-sectional view of an exemplary configuration for the single thermally stabilized high temperature fiber optic sensor 14 in FIG. 2.

FIG. 5 is a cross sectional view of an exemplary configuration 60 for the single thermally stabilized high temperature fiber optic sensor 14 in FIG. 2. The fiber optic sensor 14 includes a fiber core 42 (FIG. 3) having multiple Fiber Bragg grating structures 16, as referenced in FIG. 2. An alumina ferrule 62 is disposed around the fiber core 42. The alumina ferrule 62 provides mechanical strength and protection for the high temperature sensor 14 that will be deployed in the harsh environment. Further, a high temperature alloy ferrule 64 is disposed around the alumina ferrule to provide tolerance to high temperatures. Non-limiting examples of a high temperature alloy include stainless steel, Inconel, Invar, Kovar, Titanium, Titanium, nickel-titanium, and incoloy. In a particular embodiment, the length of the sensor 60 is about 5-10 mm and the distribution distance between two sensors is about 5-10 feet.

Figure 6:
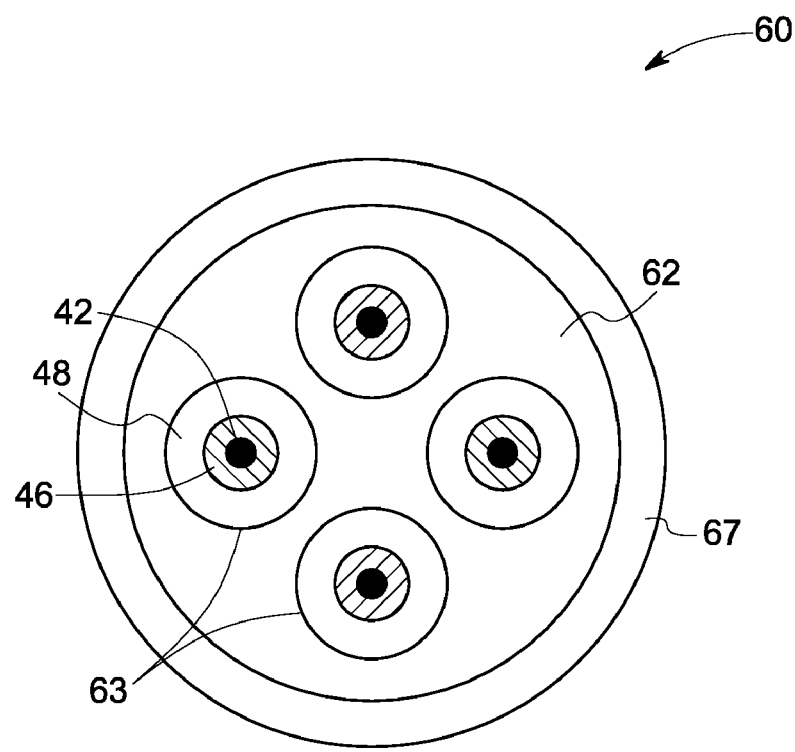
FIG. 6 is a top view of an exemplary sensor package in accordance with an embodiment of the invention.
Figure 7:
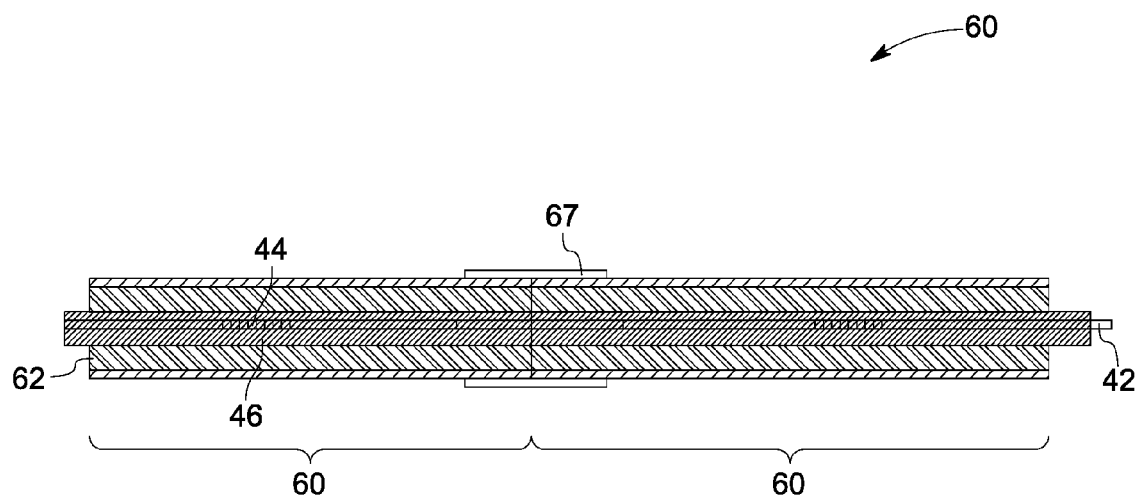
FIG. 7 is a cross-sectional view of an exemplary cascaded high temperature fiber optic sensor in accordance with an embodiment of the invention.

FIG. 6 is a top view of an exemplary sensor package 61. In the illustrated embodiment, the sensor package 61 includes four channels 63 for simplicity. It will be appreciated that there may be varying number of channels 63. Each of the channels 63 (including the fiber core 42 (FIG. 3), the depressed cladding 46 and the cladding 48 (FIG. 3)) is enclosed within the alumina ferrule 62 and the high temperature alloy ferrule 64 (FIG. 7). In a presently contemplated embodiment, the fiber core 42 has a diameter of about 9 micrometers, the depressed cladding 46 has a diameter of about 40 micrometers and the cladding 48 has a diameter of about 125 micrometers.

FIG. 7 is a cross-sectional view of a cascaded high temperature fiber optic sensor package 68. The cascaded fiber optic sensor package 68 includes coupling of multiple single sensor packages 60 in FIG. 5. In addition to the alumina ferrule 62 and the high temperature alloy ferrule 64, a metal ferrule 67 is attached to provide electrical connection between the multiple sensor packages 66. In a non-limiting example, the length of a metal ferrule 67 is about 1 foot or 0.3 m.

Figure 8:
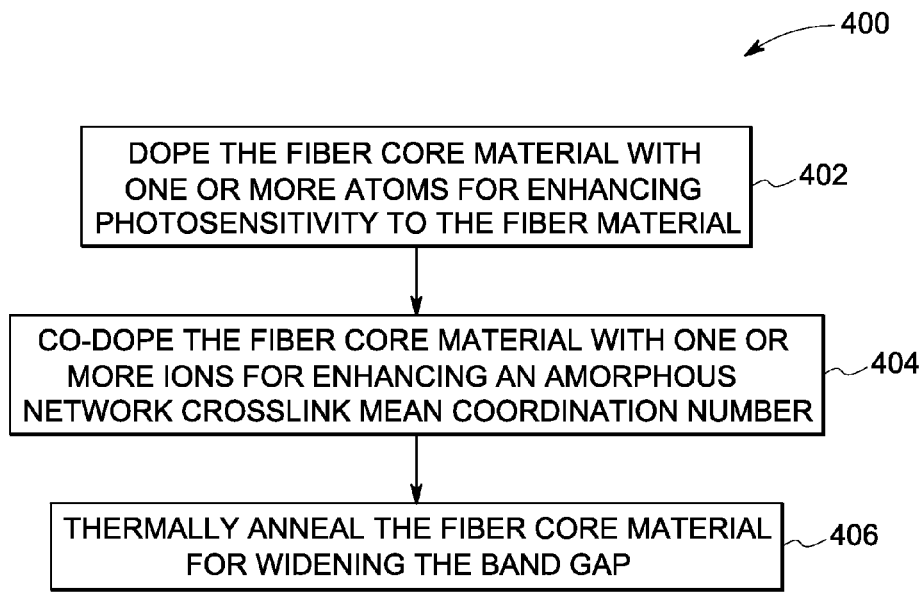
FIG. 8 is a flow chart representing steps in an exemplary method of fiber core material band gap engineering for artificially modifying fiber optic material properties in accordance with an embodiment of the invention.

FIG. 8 is a flow chart representing steps in an exemplary method 400 of fiber core material band gap engineering for artificially modifying fiber material properties. The method 400 includes doping the fiber core material with one or more atoms for enhancing photosensitivity to the fiber material in step 402. In a particular embodiment, the one or more atoms include germanium, boron, erbium and phosphorous etc. The fiber core material is also co-doped with one or more ions for enhancing an amorphous network crosslink of the silicon dioxide and its bonding mean coordination number in step 404. As used herein, the term 'network crosslink mean coordination number' refers to mean silicon atom bonding number or mean coordination number in the fiber material. In an exemplary embodiment, the one or more ions include hydrogen, chlorine, bromine and iodine. In another embodiment, the mean coordination number is enhanced to a range between about 2 to about 2.4. In yet another embodiment, the co-doping of the ions reduces dangling bond density. The fiber core material is further thermally modified for widening the band gap of the co-doped fiber core material in step 406.

Figure 9:
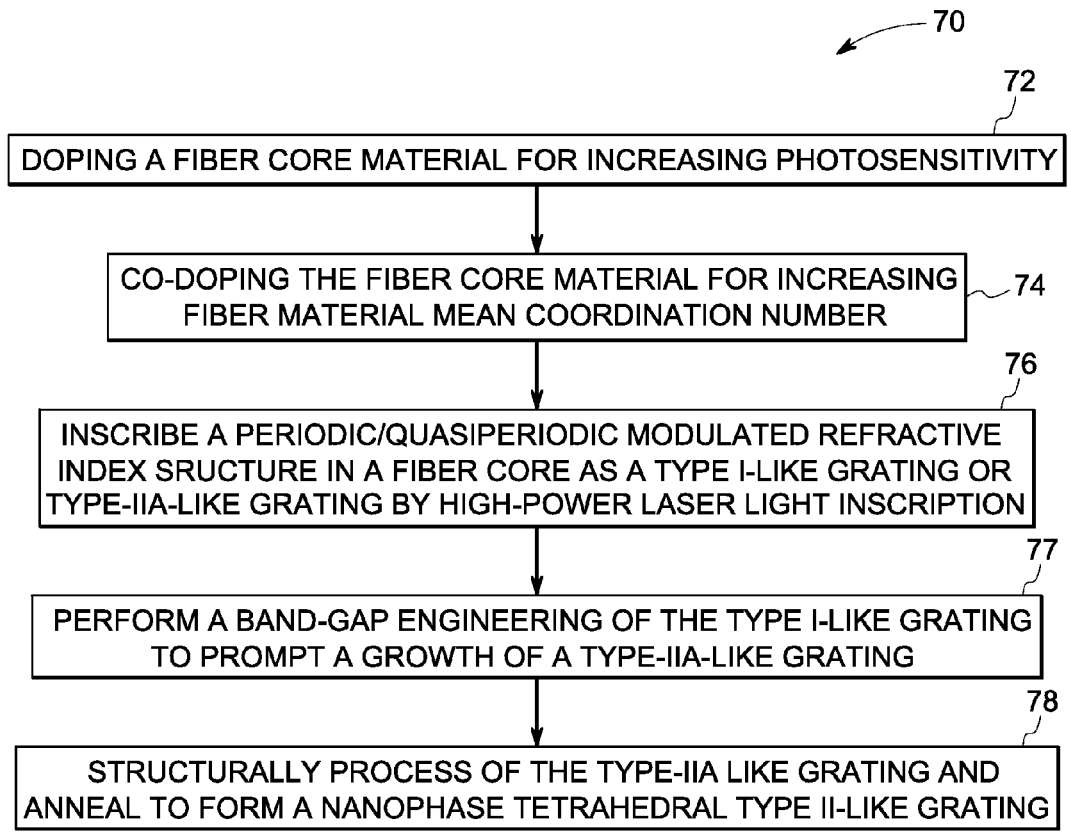
FIG. 9 is a flow chart representing steps in an exemplary method of fabrication of a thermal stabilized fiber optic sensor in accordance with an embodiment of the invention.

FIG. 9 is a flow chart representing steps in an exemplary method 70 of fabrication of the high-temperature or thermally stabilized Fiber Bragg grating structure 16 in FIG. 3. The method 70 includes doping fiber core for increasing photosensitivity in step 72. In a particular embodiment, the fiber core is doped with at least one of germanium oxide, boron, phosphorous, erbium, and tin. The fiber material is codoped for increasing fiber material mean coordination number in step 74. In a non-limiting example, the fiber material is co-doped with at least one of hydrogen, chlorine, fluorine, and iodine ions. Further, the fiber material is inscribed with a periodic or a quasiperiodic modulated refractive index structure in a fiber core as a Type-I-like grating or Type-IIA-like grating in step 76.

In a particular embodiment, the Fiber Bragg grating is hydrogen loaded prior to inscribing using ultraviolet laser light and phase mask technology. In another embodiment, the fiber Bragg grating is not hydrogen loaded prior to inscribing using near infrared femtosecond laser light and phase mask technology. In yet another embodiment, the Type-I-like grating is inscribed using pulsed ultraviolet light or near infrared femtosecond laser to enable a photon-condensation process. In another exemplary embodiment, the Type-IIA-like grating is inscribed using high-power pulsed ultraviolet light or near infrared femtosecond laser to enable a photon-condensation process.

The Type-I like grating is band gap engineered to prompt a growth of a Type-IIA-like grating in step 77. In a particular embodiment, the Type-I-like grating is thermally post treated for at least about 100 minutes to about 1000 minutes. In another embodiment, the Type-I-like grating is thermally processed at a temperature of at least about 1100 K. In yet another embodiment, an athermal process such as, but not limited to, a laser light source, is used for the Type-I-like grating. Further, the grating further undergoes structural processing to form a nanophase Type-II-like tetrahedral grating structure in step 78. In one embodiment, the Type-II-like grating is thermally post-treated at a temperature of at least about 1300 K. In another embodiment, the structural processing comprises microstructure processing and nanostructure processing. The steps 77 and 78 enable relaxation of interfacial stress or strain in nanocrystalline grains in the resulting final Bragg grating structure. In an example, the first and the second band-gap engineering process is carried out for about 100 minutes to 1000 minutes. In a particular embodiment, the nanophase highly tetrahedral grating fabricated in step 78 has about 60 percent preserved reflectivity of the initial grating inscribed in step 76.

EXAMPLES

The examples that follow are merely illustrative, and should not be construed to be any sort of limitation on the scope of the claimed invention.

Figure 10:
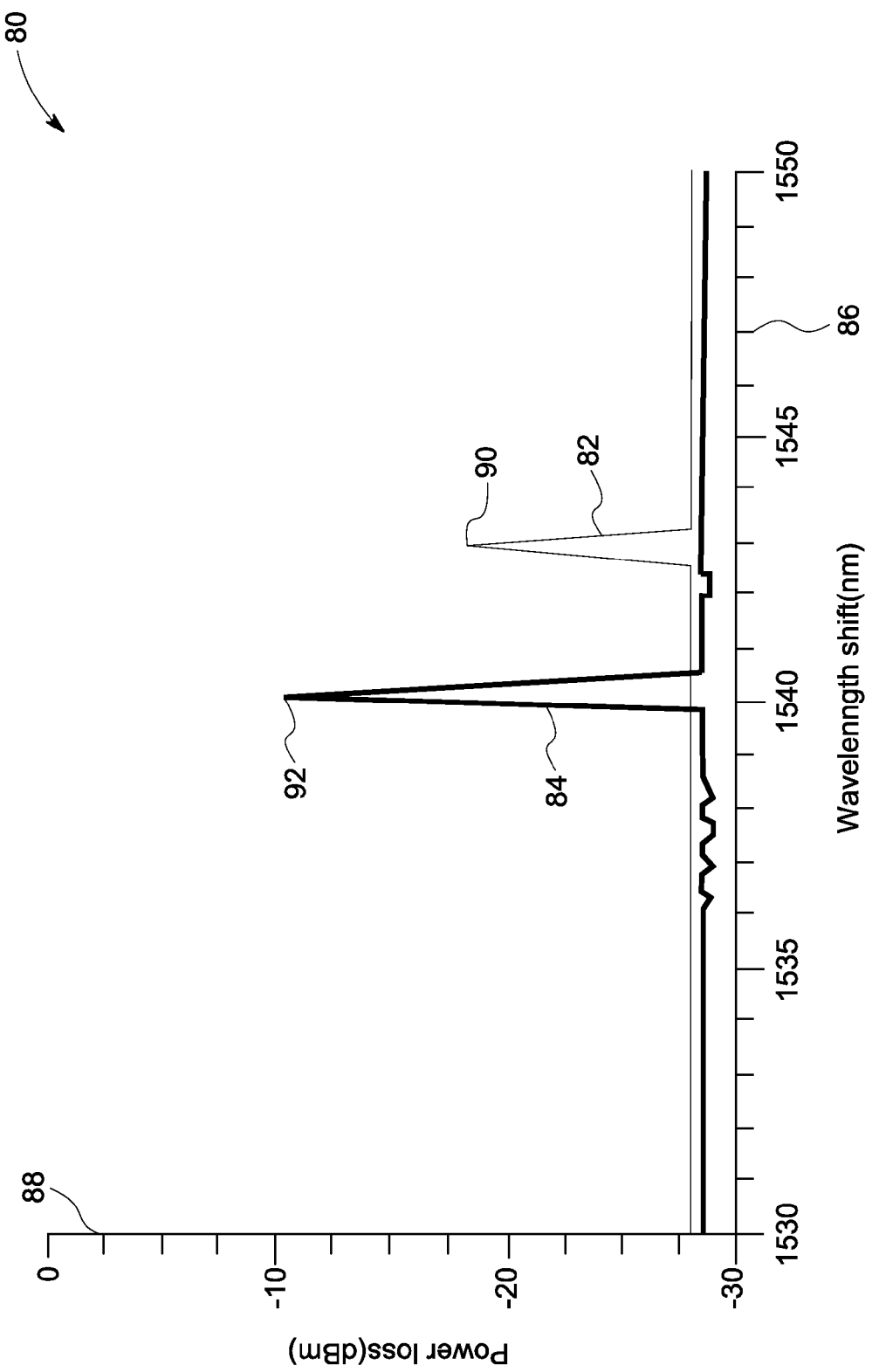
FIG. 10 is a graphical comparison between an exemplary reflection spectrum obtained from a thermal stabilized fiber Bragg grating based sensor and a reflection spectrum obtained from a Type-I Fiber Bragg grating based sensor.

FIG. 10 is a graphical comparison 80 between an exemplary reflection spectrum 82 obtained from a thermal stabilized nanocrystalline fiber Bragg grating (NFBG) sensor, fabricated with above processes, and a reflection spectrum 84 obtained from a its initial Type-I-like grating. In the illustrated embodiment, the X axis 86 represents wavelength measured in nanometers and the Y-axis 88 represents a reflected power loss measured in decibels (dB). A peak reflected power loss represented by reference numeral 90 corresponds to a fiber core guided mode of the fiber optic sensor 30, while a peak referenced by numeral 92 represents a fiber core guided mode of the commercial Fiber Bragg grating based sensor. As illustrated, a wavelength shift of about 2.87 nm occurs between the peaks 90 and 92. Further, the power loss in the fiber optic sensor 30 is reduced by about 8 dB. The fiber material used here is GeO2 doped and co-doped with 100 ppm fluorine ions.

Figure 11:
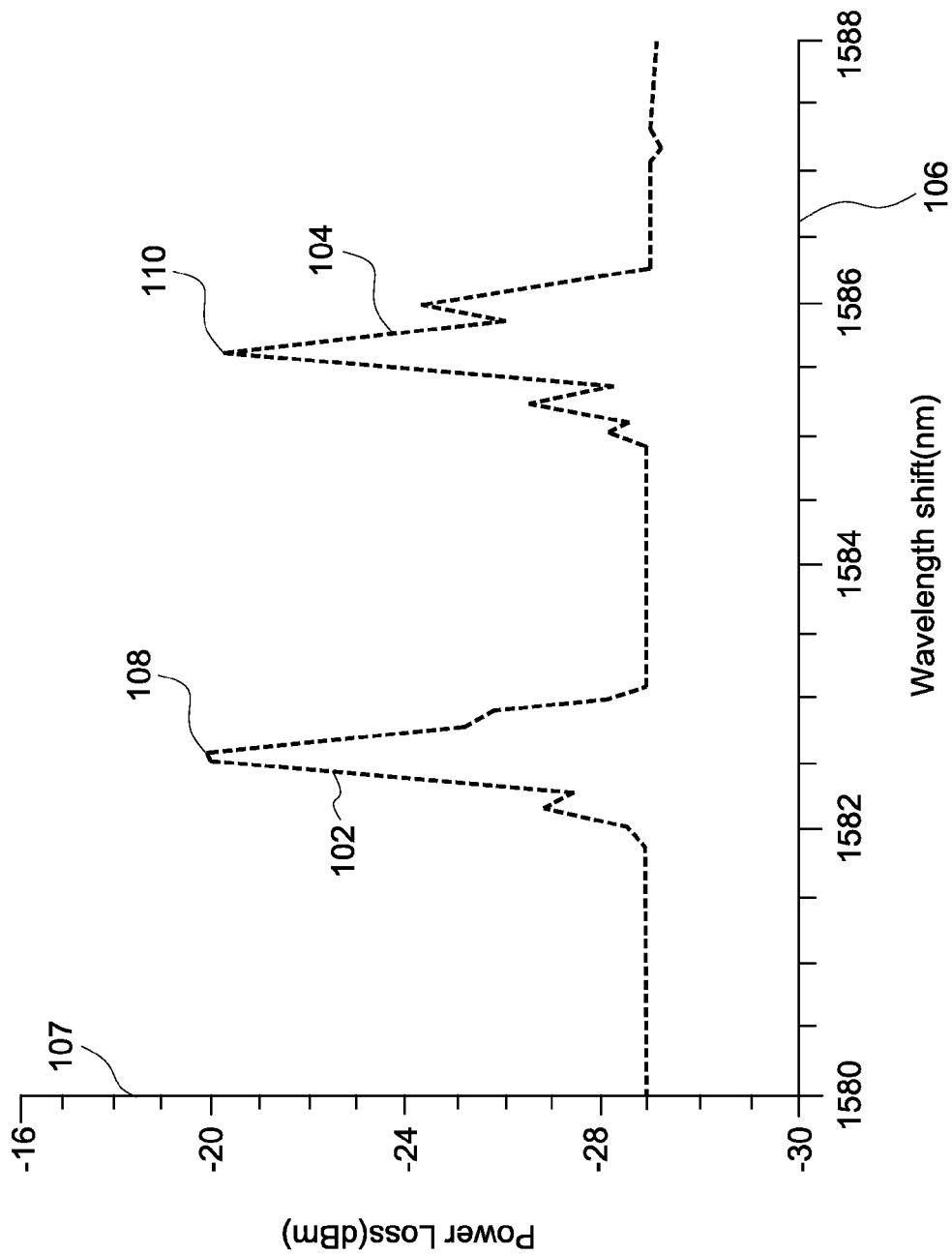
FIG. 11 is a graphical comparison between an exemplary reflection spectrum obtained from a NFBG sensor at temperatures of about 1340 K and 1370 K.

FIG. 11 is a graphical comparison 100 between an exemplary reflection spectrum 102 obtained from the fiber optic sensor 40 in FIG. 3 at a temperature of about 1340 K and a reflection spectrum 104 obtained from the fiber optic sensor 40 in FIG. 3 at a temperature of about 1370 K. The X-axis 106 represents wavelength measured in nanometers while the Y-axis 107 represents a reflected power loss measured in decibels (dB). A peak 108 represents a fiber core guided mode of the fiber optic sensor 30 at 1340 K and a peak 110 represents a fiber core guided mode of the fiber optic sensor 30 the spectrum at 1370 K. As seen, the peaks 108 and 110 correspond to an equal amount of power loss with a shift in wavelength of about 3 nm.

Figure 12:
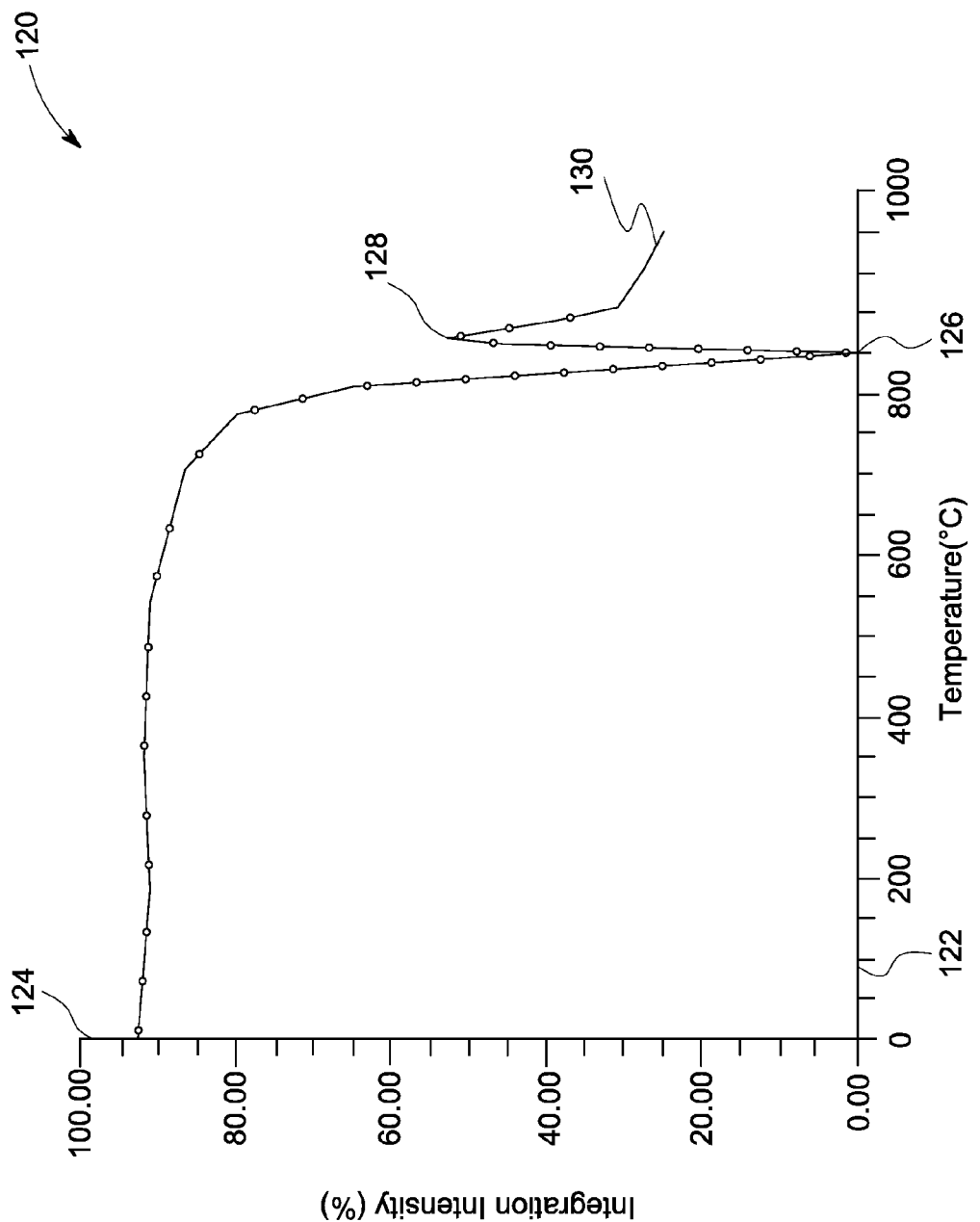
FIG. 12 is a graphical representation of intensity of signal as a function of temperature in a NFBG.

FIG. 12 is a graphical illustration 120 of reflected power of signal as a function of temperature during a tetrahedral diamond-like Bragg grating fabrication. The X-axis 122 represents temperature measured in degrees Celsius while the Y-axis 124 represents intensity measured as a percentage. The reflected power is seen to be decreasing upto about 973K or 700° C. and drops rapidly after 1073K or 800° C. to reach a minimum 126 at around 1173K or 900° C. The temperature at which the reflected power reaches a minimal may also be referred to as a Type-I grating erasure temperature. Beyond 1173K or 900° C., the intensity starts increasing rapidly to reach a maximum 128. The peak 128 corresponds to a Type II-A-like grating structure. Further, the reflected power decreases rapidly again before obtaining a peak 130 that corresponds to a Type-II-like grating structure.

Figure 13:
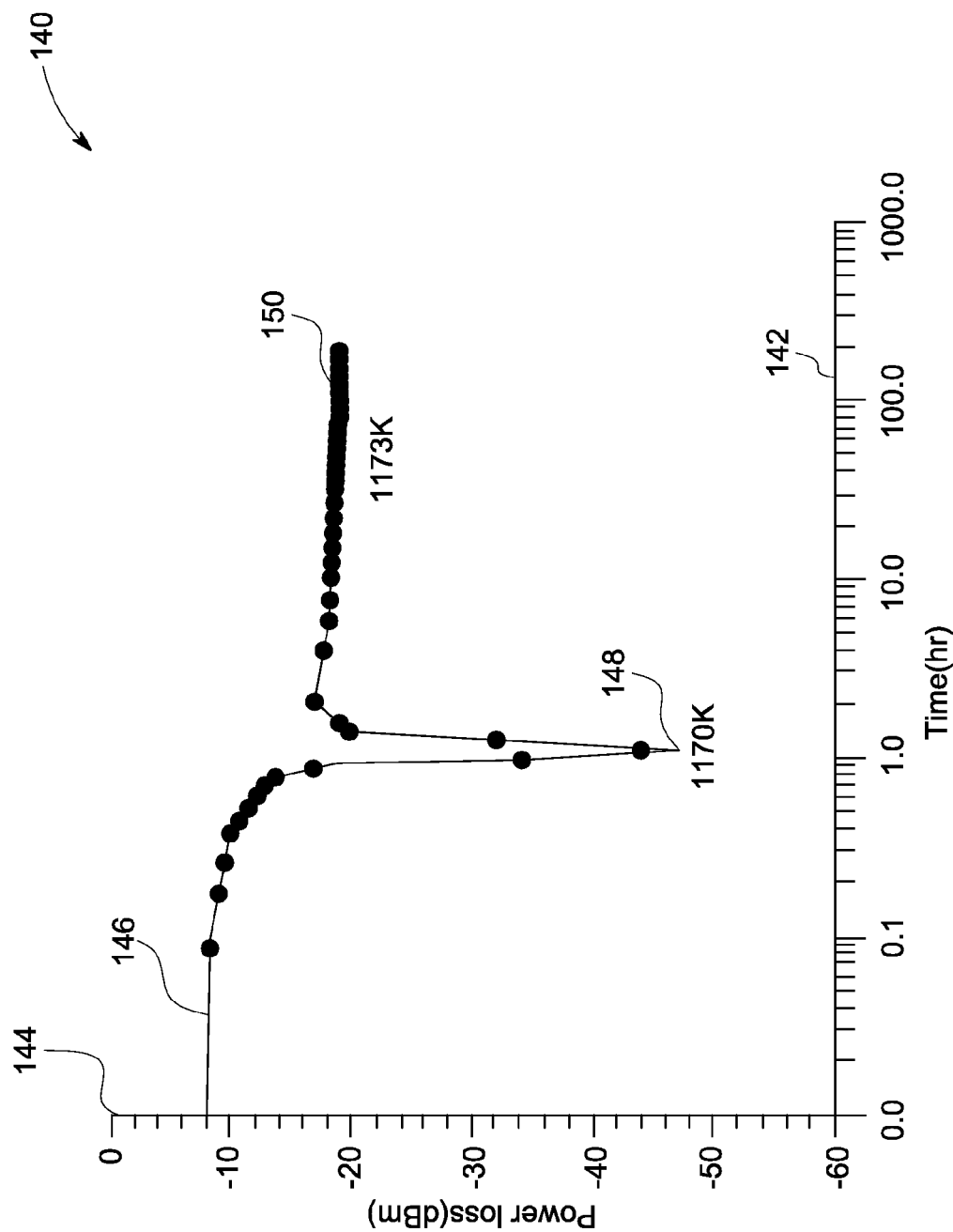
FIG. 13 is a graphical representation of a power loss response of a NFBG.

Reflected power 140 of a germanium-boron co-doped thermal stabilized fiber Bragg grating to temperature were measured over a period of time as illustrated in FIG. 13. The X-axis 142 represents time in hours and the Y-axis 144 represents power loss measured in dB. The temperature at an initial point 146 is about 300 K and is increased upto about 1175 K in about 100 hours. The power loss is steady upto about an hour at about 800 K, beyond which the power loss decreases to a minimal 148 at about 1170 K and further increases rapidly to reach a steady state 150 for a long period at about 1173 K. The fabricated Bragg grating shows 80% reflection power of initial Type-I-like grating structure referenced by numerals 146 and 150.

Figure 14:
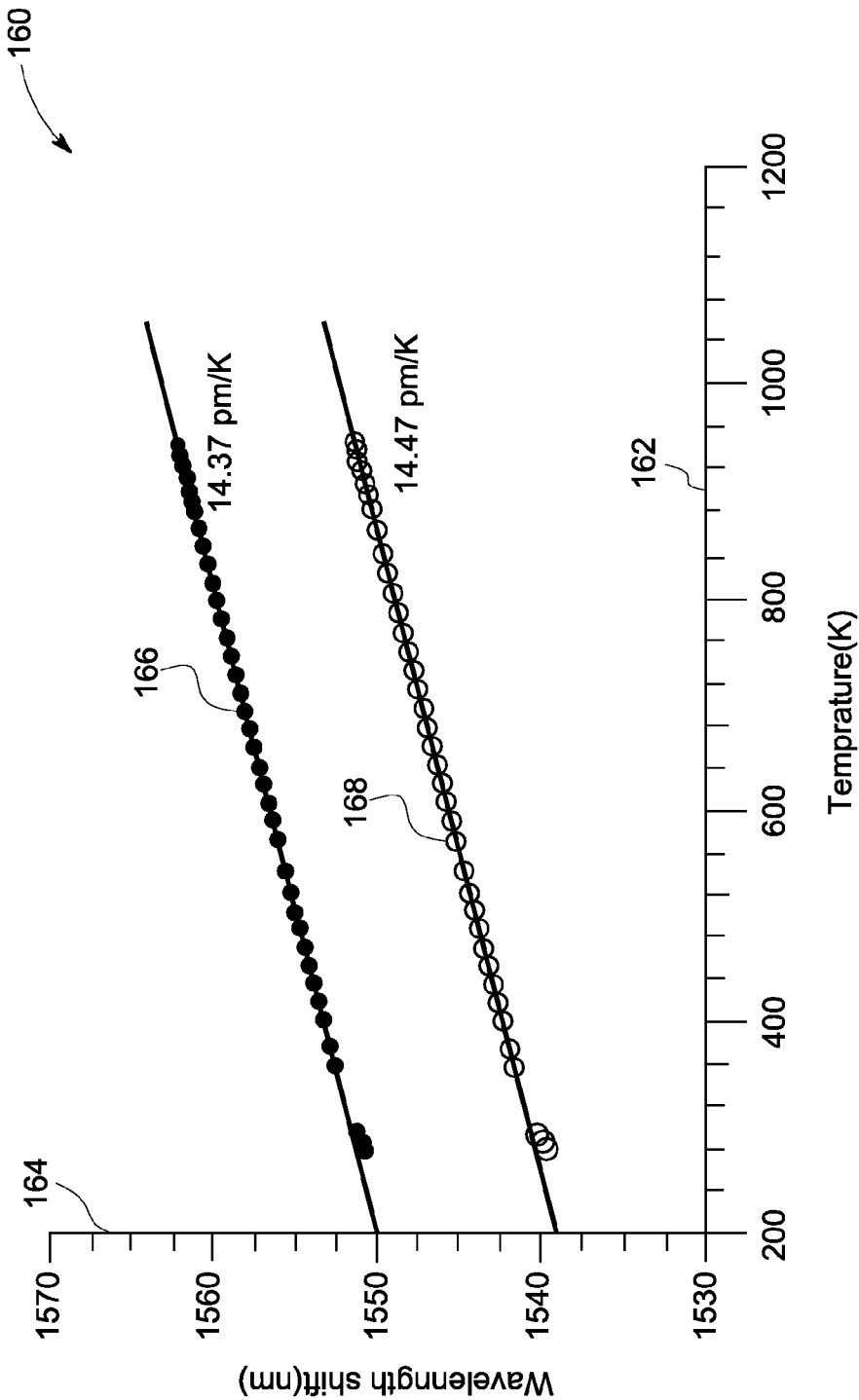
FIG. 14 is a graphical representation of a shift in wavelength as a function of temperature for two exemplary NFBGs.

FIG. 14 is a graphical illustration 160 of a shift in wavelength as a function of temperature for two exemplary fiber Bragg gratings. The temperatures range from 200 K to 1200 K. The X-axis 162 represents temperature in Kelvin and the Y-axis 164 represents a shift in wavelength measured in nanometers. Line 166 represents a linear fit for set of data points measured for a first NFBG. As illustrated, the shift in wavelength shows an increasing linear trend for temperatures varying from 200 K to 1200 K. The rate of shift was measured as 14.37 picometers (pm)/K. Similarly, in a second NFBG the shift in wavelength shows an increasing linear trend as indicated by line 168. The rate of shift was measured as 14.47 pm/K. The fiber material used here is ~8% GeO2 doped and co-doped with ~50 ppm chlorine in a cladding suppressed single-mode fiber. The temperature sensitivity of these fiber sensors is linear that spans room temperature up to at least 1000K.

Figure 15:
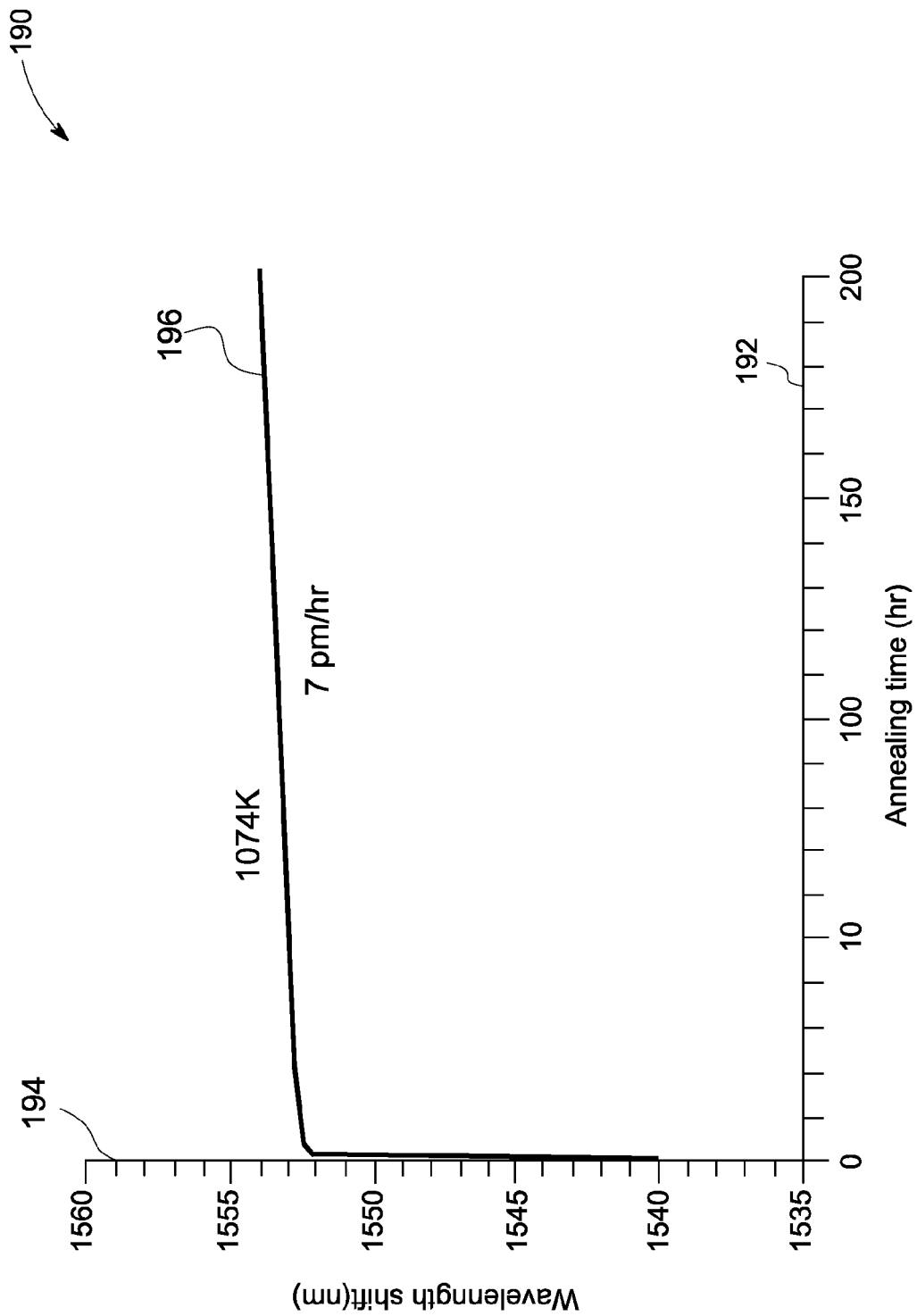
FIG. 15 is graphical representation of a shift in wavelength as a function of annealing time at varying temperatures of an exemplary NFBG.

FIG. 15 is a graphical illustration 190 of a temperature response of a sample fiber Bragg grating during its overconstrained fiber grating stress relaxing process during tetrahedral clusters percolation transition. The X-axis 192 represents annealing time in hours and the Y-axis 194 represents shift in wavelength measured in nanometers. The wavelength increases from 1540 nm at about 300 K to about 1552 nm within a few hours to reach a steady state 196 at about 1073 K for long periods of fiber grating structure stress relief and percolation of the isolated tetrahedral clusters throughout the across linked network.

Figure 16:
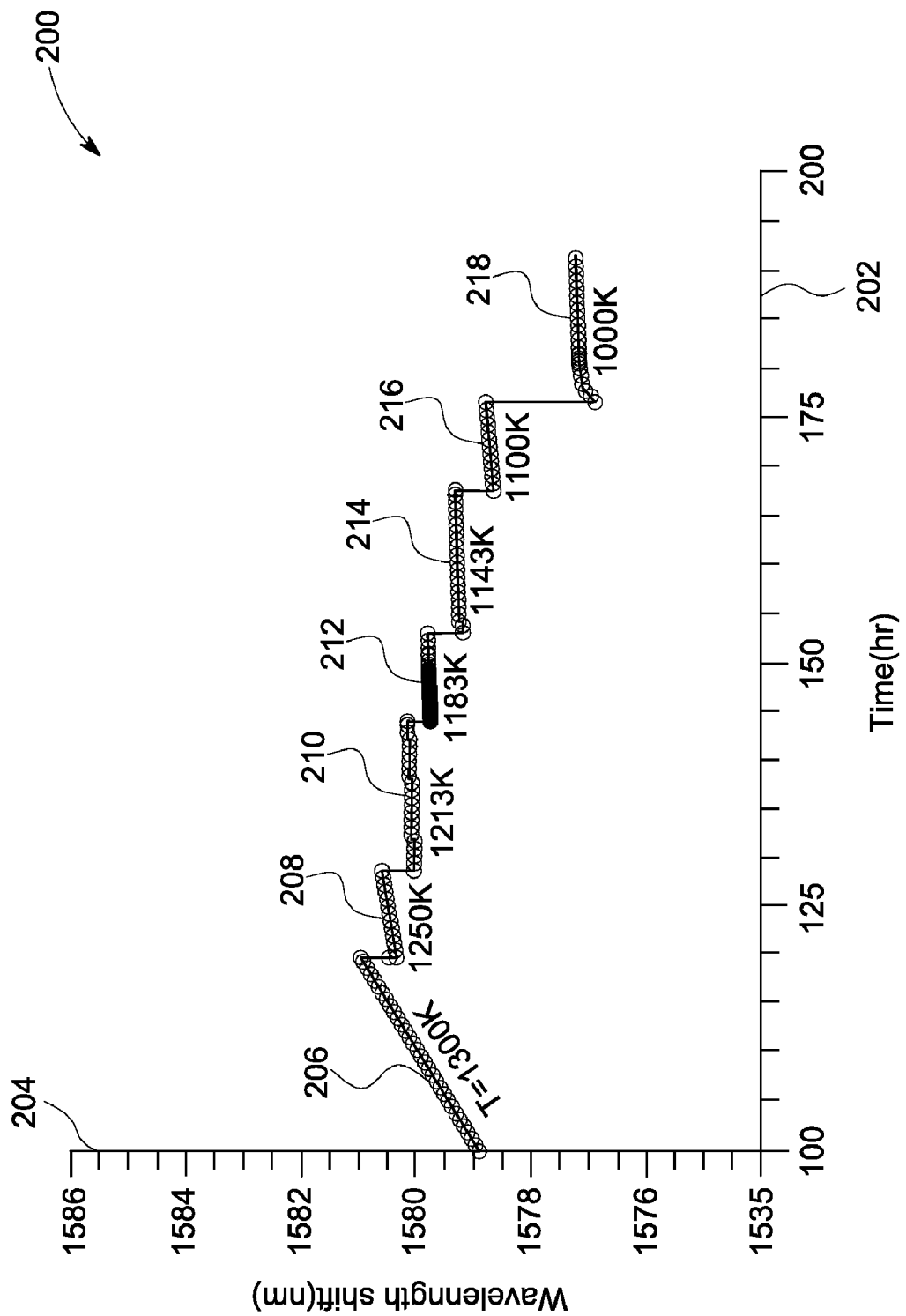
FIG. 16 is a graphical representation of a shift in wavelength as a function of time with temperatures varying from 1000 K to 1373 K.

FIG. 16 is a graphical illustration of a measured temperature response 200 from a Ge:F co-doped NFBG after its second or final band-gap modification process at 1300K that corresponds to the Type-II-like grating structure. The fiber Bragg grating sensor then is used to measure the temperature response from 1250K to 1000 K. The X-axis 202 represents time in hours and the Y-axis 204 represents a shift in wavelength in nanometers. Curve 206 represents a shift in wavelength after about 100 hours to about 120 hours at a temperature of about 1300 K for overconstrained structure relaxing and percolation transition of the tetrahedral clusters. Curve 208 represents the fiber Bragg sensor's temperature response at 1250K for about 10 hours. Similarly, curves 210, 212, 214, 216 and 218 represent thermally stabilized fiber Bragg grating responds to temperature at about 1213 K, 1183 K, 1143 K, 1100 K and about 1000 K.

Figure 17:
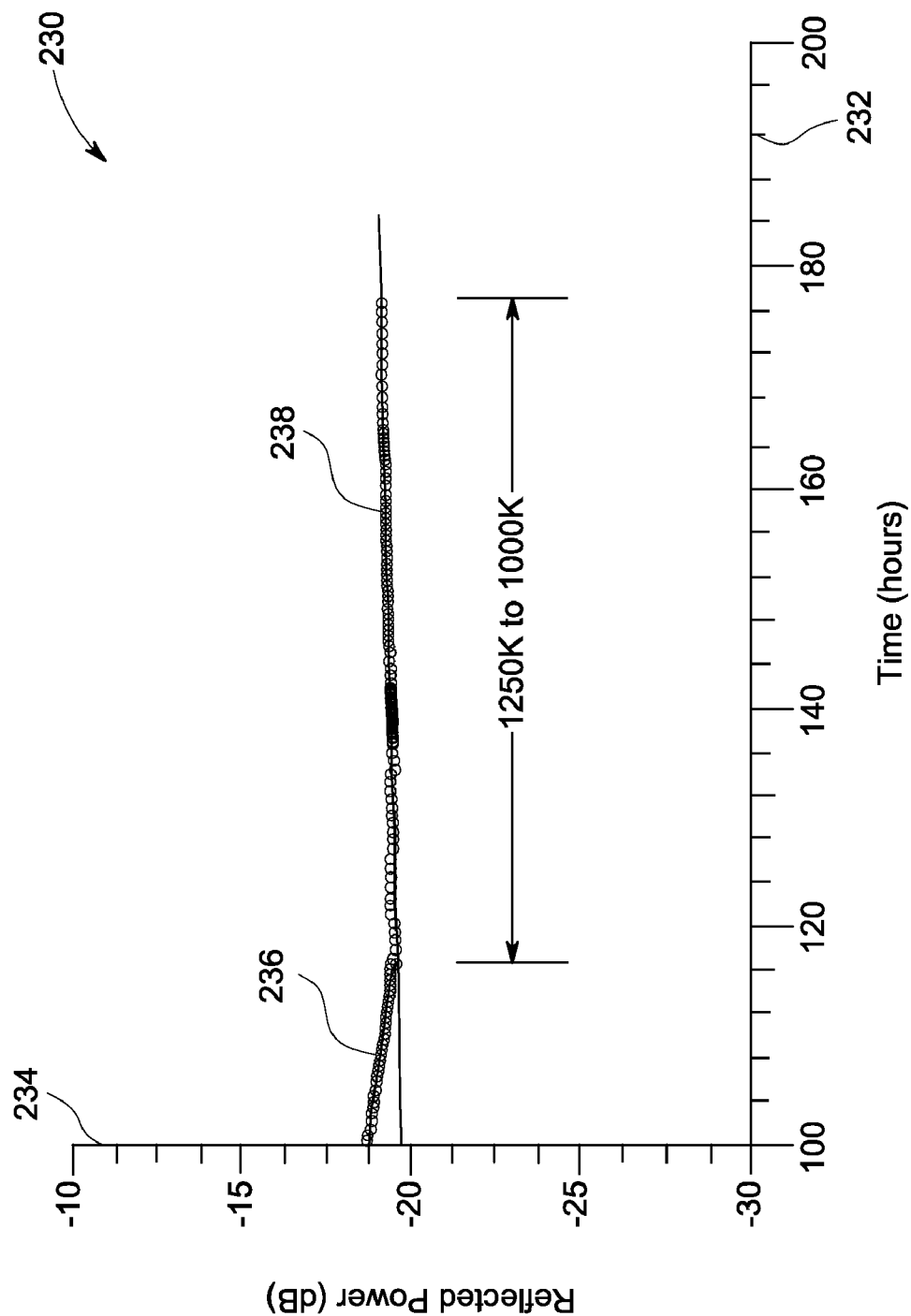
FIG. 17 is a graphical representation of power loss in an exemplary NFBG sensor as a function of time.

FIG. 17 is a graphical illustration 230 of reflected power as a function of time in hours from a Ge:F co-doped NFBG after its second or final band-gap modification process at 1300K. The fiber Bragg grating sensor then is used to measure the temperature response from 1250K to 1000 K. The X-axis 232 represents time in hours and the Y-axis 234 represents reflected power measured in dB. Curve 236 represents a steady decrease in power loss in about 20 hours at temperature of 1300 K. The rate of power loss of curve 236 was observed to be −0.043 dB/hour. This decrease in reflected power indicates the formation process of diamond-like tetrahedral structure and overconstrained stress relaxing dynamics. Curve 238 represents reflected power for about 60 hours for temperature from 1250 K to 1000 K. The temperature insensitive reflectivity of the NFBG sensor demonstrated its stable percolative tetrahedral structure formation.

Figure 18:
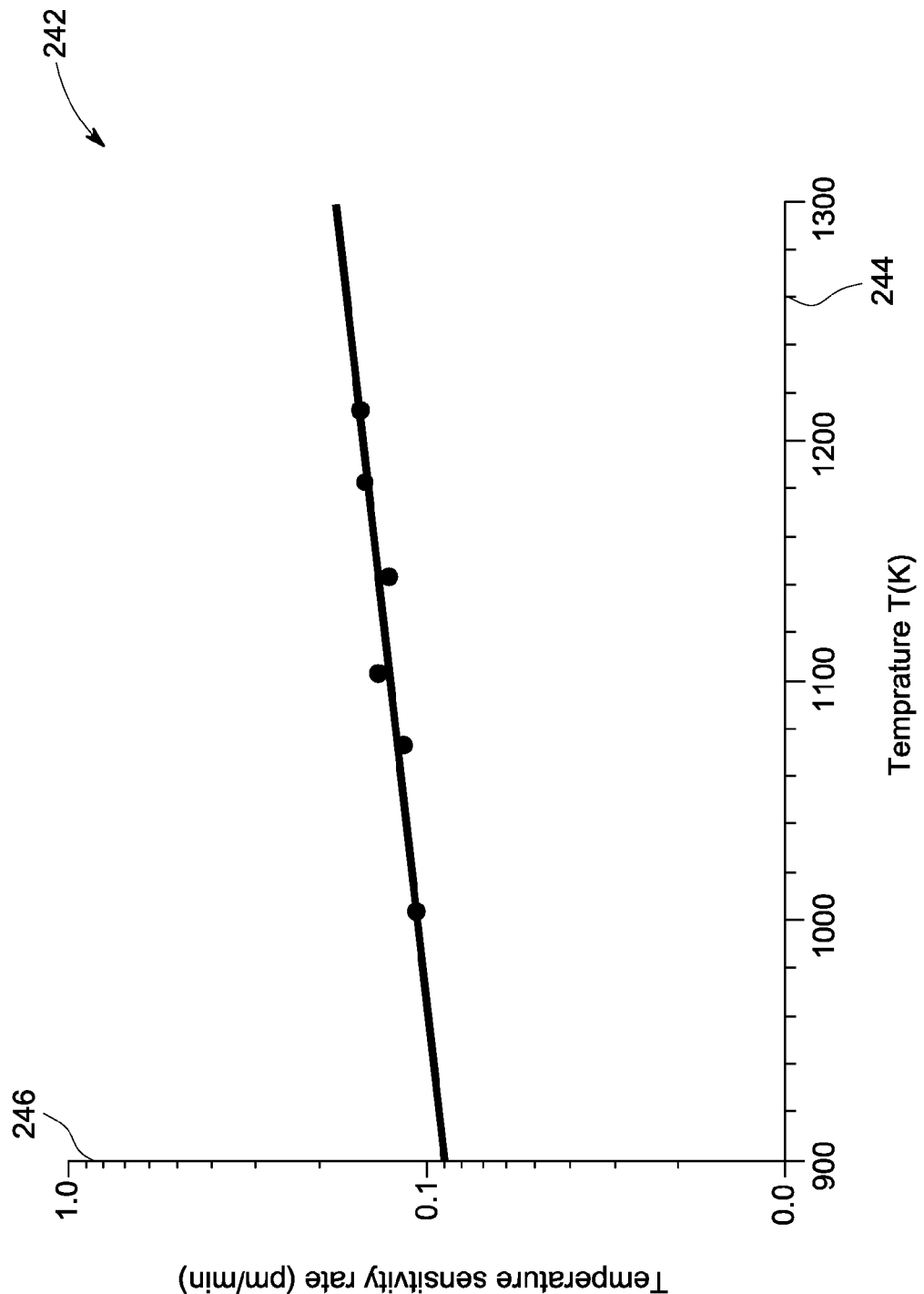
FIG. 18 is a graphical representation of a rate of shift in wavelength as a function of temperature in a NFBG sensor.

FIG. 18 is a graphical illustration 242 of a fiber Bragg grating sensor's thermal response characteristics. Here the measured data demonstrates the fiber sensor has a constant rate of shift in wavelength for temperature from 950K to 1250K. The X-axis 244 represents temperature in Kelvin and the Y-axis 246 represents temperature sensitivity rate measured in pm/min. As illustrated by a linear fit 248 there was a negligible drift in wavelength even at higher temperatures such as 1200 K since the fiber Bragg grating sensor's temperature sensitivity is about 15 pm/K.

The fiber Bragg grating sensor's thermal response for T<1200K can be described approximately by its temperature sensitivity of $\delta\lambda/\delta T$ ~15 pm/K and the temperature is proportional to wavelength shift by $\Delta T = \Delta\lambda/(\delta\lambda/\delta T)$. However, it will be difficult to use this sensitivity for accurate high-temperature measurement whenever the rate of the wavelength shift is not negligible. The determination of the accurate temperature here is based on temperature sensitivity rate, indicated by exponential fitting in FIG. 18. The temperature is determined by $\Delta T = (\Delta\lambda/\Delta t)/(\delta\lambda/\delta t\ \delta T)$, where the temperature sensitivity rate is $(\delta\lambda/\delta t\ \delta T) \sim 0.0194*\exp(0.0017*T)$ pm/min*K for T≦1300K. The wavelength shift rate ($\Delta\lambda/\Delta t$) will be used for temperature determination for T>1000K.

Figure 19:
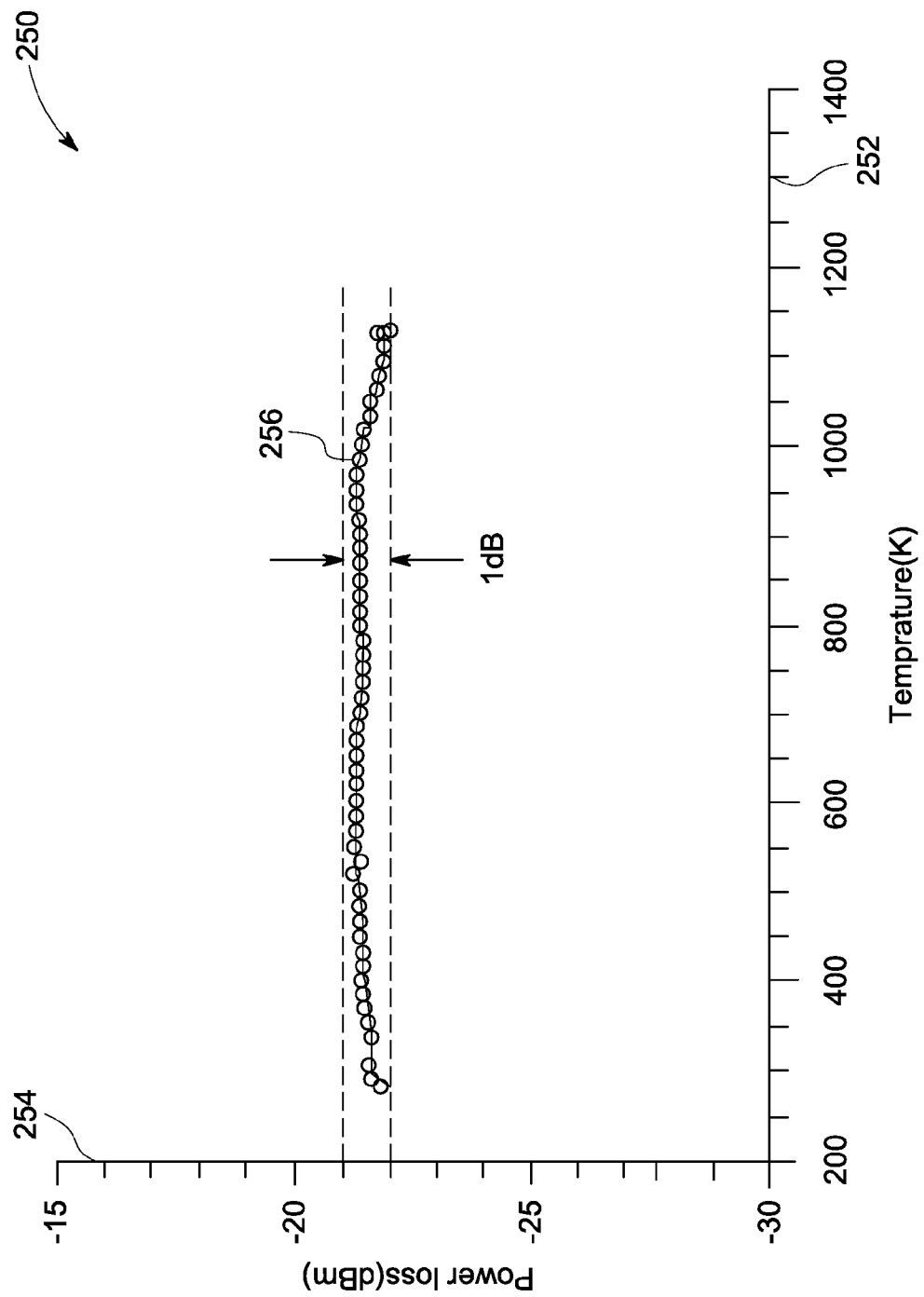
FIG. 19 is a graphical representation of power loss as a function of temperature ranging from 200 K to 1300 K.

Power loss was measured for temperatures ranging from 200 K to 1300 K as illustrated and referenced by numeral 250 in FIG. 19. The X-axis 252 represents temperature measured in Kelvin and the Y-axis 254 represents power loss measured in dB. Curve 256 shows that the power loss was steady at about −22 dB with a negligible drift of about 1 dB across the temperature range. Thermal stability of NFBG sensors was further established at higher temperatures.

Figure 20:
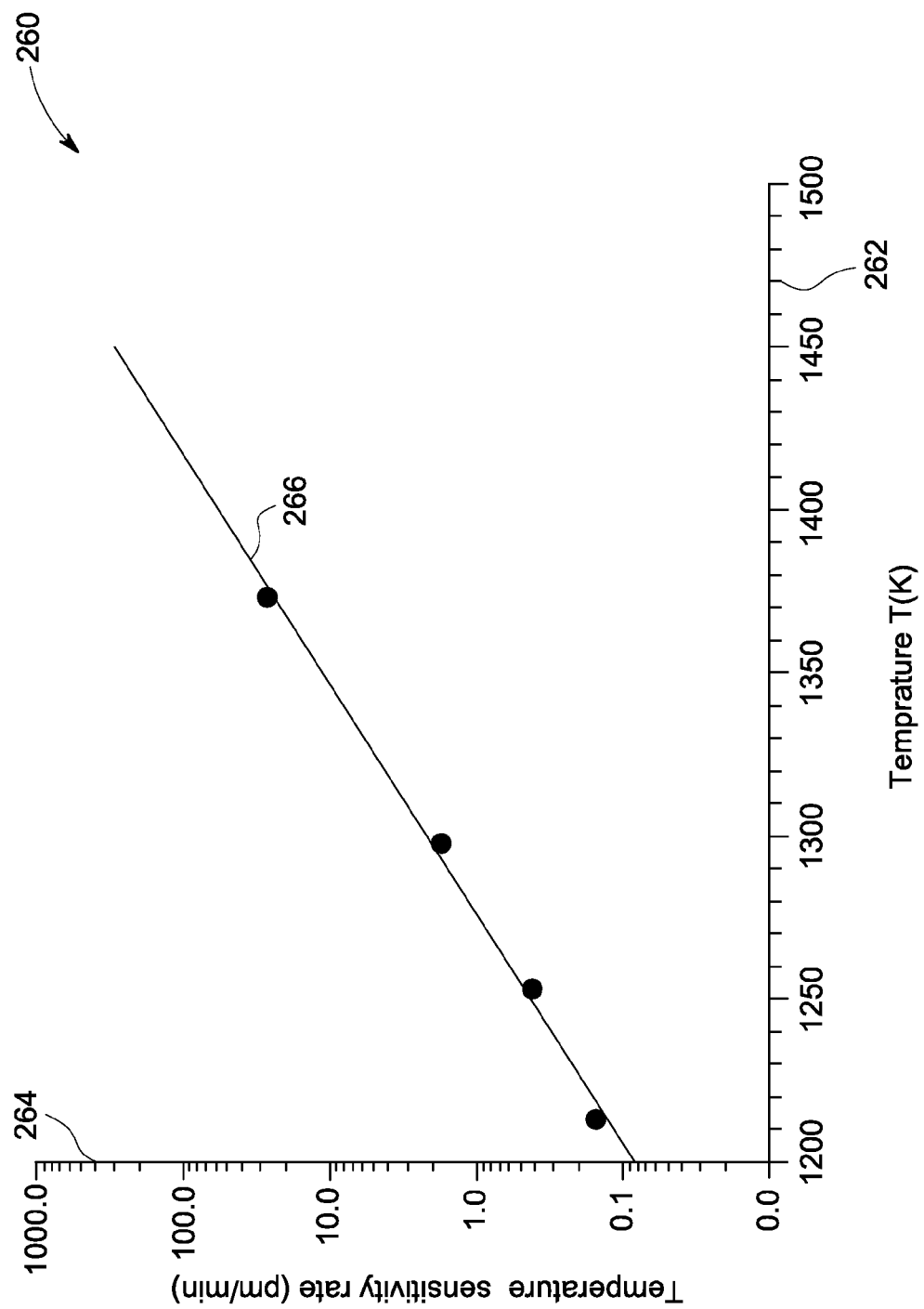
FIG. 20 is a graphical representation of rate of wavelength shifting as a function of temperature above 1200 K.

FIG. 20 is a graphical illustration 260 of temperature sensitivity rate as a function of temperature for temperatures ranging above 1200 K. The X-axis 262 represents temperature measured in Kelvin and the Y-axis 264 represents temperature sensitivity rate measured in pm/min. As indicated by linear fit 266, the temperature sensitivity rate was observed to be an exponential function of temperature for temperatures ranging from 1200 K to about 1450 K.

Figure 21:
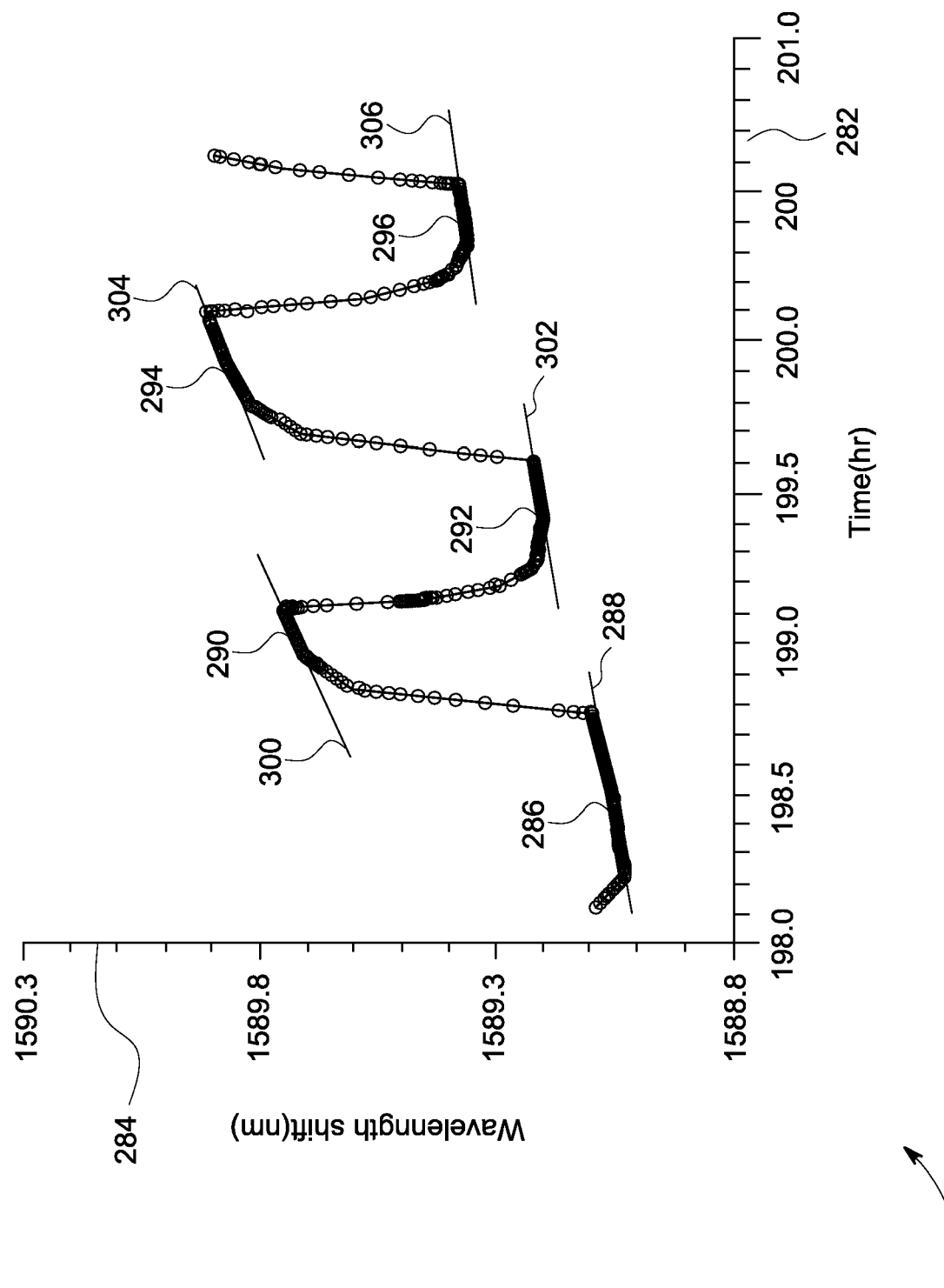
FIG. 21 is a graphical representation of a shift in wavelength as a function of time at temperatures of about 1284 K and about 1296 K.

Shift in wavelength was also measured at temperatures of about 1280 K and 1296 K as a function of time as illustrated in FIG. 21 by plot 280. The X-axis 282 represents time measured in hours and the Y-axis 284 represents wavelength shift measured in nm. Curve 286 represents wavelength shift at about 1284 K after about 198 hours. The rate of shift in wavelength as represented by slope 288 was observed to be about 113.8 pm/hour. Similarly, curves 290, 292, 294 and 296 represent shifts in wavelength at about 1296 K, 1284 K, 1294 K and 1280 K respectively. The rate of shift in wavelength as indicated by slopes 300, 302, 304 and 306 was measured to be about 290 pm/hr, 116 pm/hr, 250 pm/hr and 83 pm/hr respectively.

The temperature measurement for T>1000K can be established by measuring wavelength deviation within unit time interval, instead of wavelength itself. This method will give dynamic temperature reading for any harsh environment of T>1000K.

Figure 22:
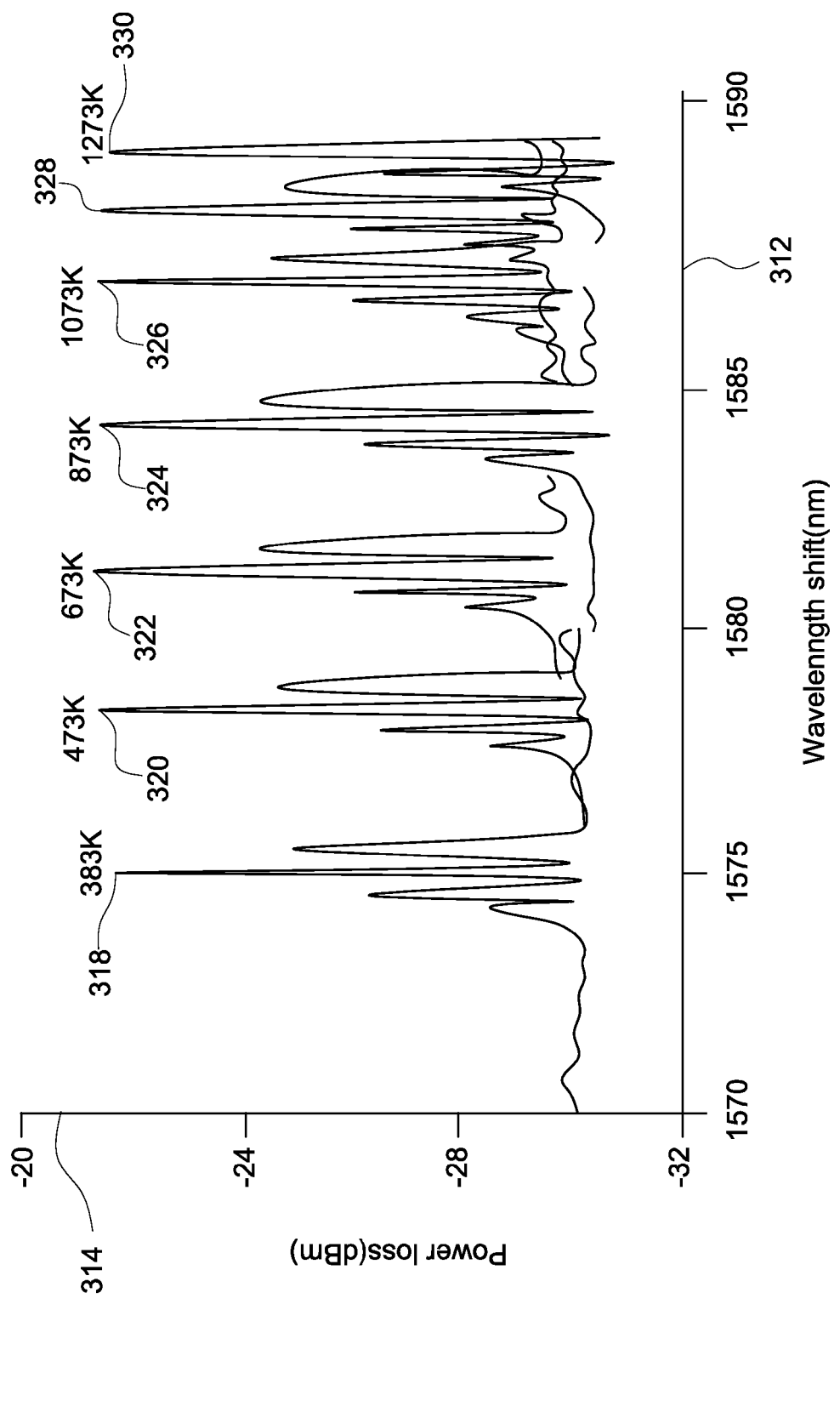
FIG. 22 is a graphical representation of a power loss spectrum of an exemplary NFBG sensor as a function of temperature varying from 300 K to 1273 K.

FIG. 22 is a power loss spectrum 310 of a NFBG sensor at various temperatures. The temperatures range from 300 K to 1273 K. The X-axis 312 represents wavelength measured in nm and the Y-axis 314 represents power loss in dB. Peaks were observed at different wavelengths and temperatures. Peaks 318, 320, 322, 324, 326, 328 and 330 correspond to power loss at temperatures 303 K, 473K, 673 K, 873 K, 1073 K, 1173 K and 1273 K respectively at wavelengths of 1575 nm, 1579 nm, 1581 nm, 1584 nm, 1587 nm, 1588 nm and 1273 nm. The reflected power spectra further demonstrated the band-gap engineered tetrahedral structure based fiber Bragg grating has much high thermal stability and survivability to harsh environmental condition.

The various embodiments of a fiber optic system and method for temperature sensing described above thus provide a way to achieve, efficient and accurate measurement of parameters in a harsh environment. The system also allows for high thermal survivability in temperatures ranging from 1000 K due to an improved fiber grating fabrication technique.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of an example of a gaussian or cosine apodized grating profile in a fiber optic grating described with respect to one embodiment can be adapted for use with a cascaded fiber optic sensor package described with respect to another. Similarly, the various features described, as well as other known equivalents for each feature, can be mixed and matched by one of ordinary skill in this art to construct additional systems and techniques in accordance with principles of this disclosure.

While only certain features of the invention have been illustrated and described herein, modifications and changes will occur to those skilled in the art. It is, therefore, to be understood that the appended claims are intended to cover all such modifications and changes as fall within the true spirit of the invention.

The invention claimed is:

1. A method of fiber core material band-gap engineering for artificially modifying fiber material properties comprising:
doping the fiber core material with one or more atoms for enhancing photosensitivity to the fiber material;
co-doping the fiber core material with one or more ions for enhancing an amorphous network crosslink mean coordination number; and
thermally annealing the fiber core material for widening the band gap of the fiber core material.

2. The method of claim 1, wherein the doping comprises doping with one or more atoms selected from a group consisting of germanium, boron, erbium and phosphorus.

3. The method of claim 1, wherein the co-doping comprises co-doping with one or more ions selected from a group consisting of hydrogen, chlorine, bromine and iodine.

4. A method of fabrication of a thermally stabilized fiber Bragg grating-based temperature sensing device comprising:
doping a fiber core material for enhancing photosensitivity;
co-doping the fiber core material for increasing a mean coordination number;
inscribing a periodic or quaisperiodic modulated refractive index structure in the fiber core as a Type-I-like grating;
performing a band-gap engineering of the Type-I-like grating to prompt a growth of a Type IIA-like grating; and
structural processing of the Type-IIA-like grating and annealing to form a nanophase tetrahedral Type II-like grating structure.

5. The method of claim 4, further comprising using a thermal band-gap engineering process after the inscribing to form a thermally stable intermediate phase structure.

6. The method of claim 4, further comprising structural processing after the forming of the nanophase Type-II-like grating structure.

7. The method of claim 4, wherein the inscribing comprises inscribing via a phase mask technique.

8. The method of claim 7, wherein the phase mask technique comprises using a pulsed high-power UV laser or a near infrared femtosecond laser light.

9. The method of claim 4, wherein the inscribing comprises using ultraviolet light to enable a photon-condensation process.

10. The method of claim 4, wherein performing the band-gap engineering comprises thermally post-treating the Type-I-like grating for at least about 100 minutes to about 1000 minutes.

11. The method of claim 4, wherein performing the band-gap engineering of the Type-I-like grating comprises thermal processing at a temperature of at least about 1000 K.

12. The method of claim 4, wherein the structural processing of the Type-IIA-like grating comprises thermal post-treating at a temperature of at least about 1300 K.

13. The method of claim 4, wherein performing the band-gap engineering comprises using an athermal process.

14. The method of claim 13, wherein using the athermal process comprises using a laser.

15. A thermally stabilized fiber Bragg grating based sensor comprising:
a fiber core having a plurality of Bragg grating elements wherein, the grating elements comprise:
a periodic or a quasiperiodic modulated tetrahedral structure; and
an apodized grating profile;
a depressed cladding comprising at least one dopant disposed about the fiber core and configured to confine the at least one dopant within the fiber core; and
a cladding disposed around the depressed cladding.

16. The sensor of claim 15, wherein the fiber core comprises a non-photosensitive fused quartz single mode fiber.

17. The sensor of claim 15, wherein the fiber core comprises silicon dioxide doped with germanium dioxide.

18. The sensor of claim 15, wherein the depressed cladding comprises silicon dioxide doped with at least one of chlorine, boron, phosphorous, erbium and fluorine.

19. The sensor of claim 15, wherein the cladding comprises silicon dicoxide.

20. The sensor of claim 15, wherein the fiber core is hydrogen loaded.

21. The sensor of claim 15, wherein the sensor can sense temperatures upto at least about 1300 K.

22. The sensor of claim 15, wherein the fiber core comprises a depressed cladding doped with at least one of fluorine or chlorine.

23. The sensor of claim 15, wherein the fiber core is doped with germanium and hydrogen loaded.

24. The sensor of claim 15, wherein the sensor senses a temperature based upon an associated temperature sensitivity for temperatures less than about 1200 K.

25. The sensor of claim 15, wherein the sensor senses a temperature based upon an associated temperature sensitivity rate for temperatures more than 1200 K.

26. The sensor of claim 15, wherein the apodized grating profile comprises a Gaussian profile.

27. The sensor of claim 15, wherein the apodized grating profile comprises a cosine profile.

28. The sensor of claim 15, wherein the fiber core comprises a periodic modulated nanophase structure.

29. The sensor of claim 15, wherein the apodized grating profile comprises alternative constrained tetrahedral structure below a threshold of percolation in a low refractive index area of the fiber core and an overconstrained tetrahedral structure that is above a threshold of percolation in a high refractive index area of the fiber core.

30. The sensor of claim 29, wherein the underconstrained structure and the overconstrained tetrahedral structure comprise a Type-IIA-like grating.

31. The sensor of claim 29, wherein the constrained and the overconstrained tetrahedral structure comprise a Type-II-like grating.

* * * * *

UNITED STATES PATENT AND TRADEMARK OFFICE
CERTIFICATE OF CORRECTION

PATENT NO. : 7,499,605 B1  Page 1 of 1
APPLICATION NO. : 11/855457
DATED : March 3, 2009
INVENTOR(S) : Xia et al.

It is certified that error appears in the above-identified patent and that said Letters Patent is hereby corrected as shown below:

In the drawing: Fig. 15, Sheet 12 of 19, delete "10" and insert -- 50 --, therefor.

In the drawing: Fig. 21, Sheet 18 of 19, delete "200" and insert -- 200.5 --, therefor.

Column 11, Line 24, in Claim 4, delete "quaisperiodic" and insert -- quasiperiodic --, therefor.

Column 12, Line 22, in Claim 19, delete "dicoxide." and insert -- dioxide. --, therefor.

Signed and Sealed this

Twenty-sixth Day of May, 2009

JOHN DOLL
*Acting Director of the United States Patent and Trademark Office*